United States Patent Office 3,483,481
Patented Dec. 9, 1969

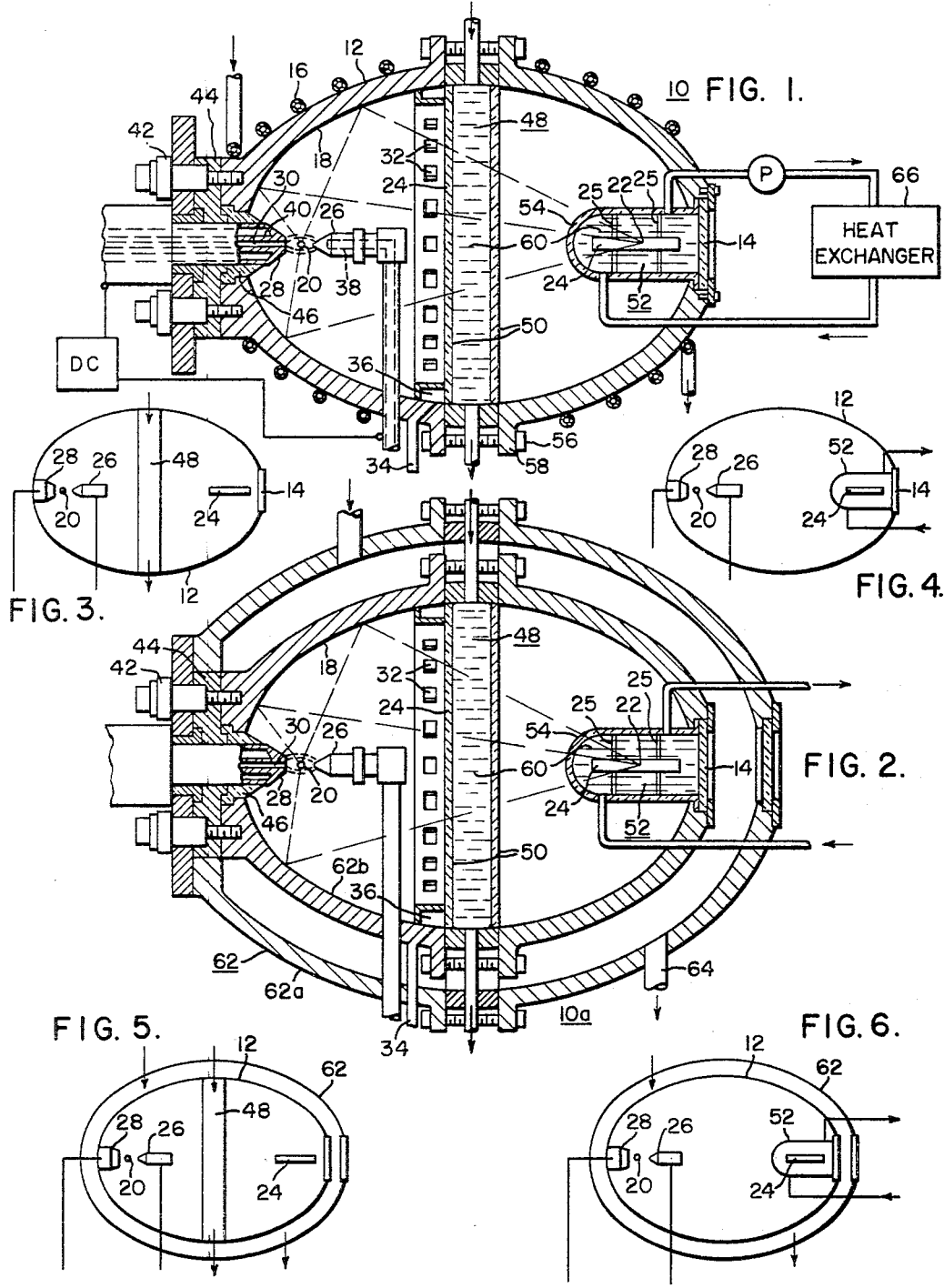

3,483,481
RADIATION SOURCE FOR PRODUCING CONTINUOUS COHERENT RADIATIONS
Charles H. Church, Wilkinsburg, William S. Davenport, Derry, Blairsville, and Robert D. Haun, Jr., Pitcairn, Monroeville, Pa., assignors to Westinghouse Electric Corporation, Pittsburgh, Pa., a corporation of Pennsylvania
Filed Mar. 2, 1966, Ser. No. 531,103
Int. Cl. H01s 3/10
U.S. Cl. 331—94.5                    5 Claims

ABSTRACT OF THE DISCLOSURE

For continuous and efficient pumping of a laser, a unitary envelope is formed as a reflecting ellipsoid, with an intense arch discharge disposed at one elliptical focus and the laser to be energized disposed at the other elliptical focus, with both foci enclosed by the envelope. A window in the envelope passes the coherent radiations generated by the laser. Between the two foci is disposed a liquid filter, with the liquid filter adapted to be cooled exteriorly of the envelope. The liquid filter medium absorbs those radiations which are not effective to energize the laser so that a maximum of effective pumping is achieved while simultaneously minimizing the heating of the laser.

---

This invention relates to radiation sources and, more particularly, to a radiation source which can produce coherent radiations of very high intensity.

A source for generating a very high intensity, focused beam of radiations is disclosed in copending application Ser. No. 261,756, filed Feb. 28, 1963, and owned by the present assignee. The radiations emitted by this source are focused externally of the source and can be used for continuous excitation of a laser material, in order to effect continuous laser pumping, as contrasted to pulsed laser pumping. The radiations which are emitted from the source disclosed in this copending application include a wide spectrum of radiations, most of which are not effective to excite, energize, or pump the laser material, but which do contribute to overheating of the laser material. In copending application Ser. No. 496,354, filed Oct. 15, 1965, and owned by the present assignee, is disclosed a radiation-concentrating device and lens wherein a lens system, which absorbs a substantial portion of the radiations generated by the aforementioned source, is positioned exterior to the source so that substantially only those radiations which are desired to excite a laser material are transmitted therethrough. By this means, the laser material can be continuously pumped without being overheated. While this system is quite satisfactory for continuous laser pumping, it is not as effective as desired since the external focal region is quite large and, in addition, the individual separate components which comprise the entire system must be accurately positioned with respect to one another and maintained in this positioning.

It is the general object of this invention to provide a unitary radiation source which will generate continuous, coherent radiations.

It is another object to provide a unitary radiation source which will effectively generate continuous, coherent radiations without overheating the laser material.

It is a further object to provide a unitary radiation source which will generate continuous, coherent radiations, wherein the elements comprising the source are always accurately positioned with respect to one another, and wherein the laser component of the source is very efficiently energized or pumped.

The foregoing objects of the invention, and other objects which become apparent as the description proceeds, are achieved by providing a unitary envelope member which contains the principle components comprising the source with a small portion of the envelope formed as a window. A reflecting surface is positioned within the envelope at a location which is spaced from the window. The reflecting surface has a first focal point positioned at a location remote from the window and a second focal point positioned at a location which is preferably proximate the envelope window. Radiations which are generated proximate the first focal point will be focused proximate the second focal point. A laser material, such as a rod, is positioned proximate the second focal paint in order to intercept radiations which are generated proximate the first focal point. Electrodes are positioned within the envelope proximate the first focal point of the reflecting surface and are adapted to be energized to generate therebetween an intense electric arc. Between the first focal point and the second focal point within the envelope, is interposed a liquid, radiation-absorbing filter which will transmit in substantial quantity only the relatively narrow spectrum of radiations which are effective to energize or pump the laser. In this manner there is provided a self-contained unit which will effectively and efficiently generate continuous, coherent radiations.

For a better understanding of the present invention, reference should be had to the accompanying drawings wherein:

FIGURE 1 is a sectional elevation of a continuous, coherent radiation source constructed in accordance with the present invention wherein the middle section of the enclosing envelope comprises a liquid filter, and an additional liquid filter is provided about the laser material;

FIG. 2 is a sectional view of an alternative embodiment of the present invention wherein the surrounding or enclosing envelope has a double wall in order to minimize pressure strains on the inner member of the double-walled envelope;

FIG. 3 is a schematic view showing an alternative radiation source generally similar to that shown in FIGURE 1, but without the additional liquid filter member which surrounds the laser rod;

FIG. 4 is a schematic view showing an alternative source generally similar to that shown in FIG. 1, except that the liquid filter which is positioned in the middle section of the envelope is eliminated;

FIG. 5 is a schematic view of a part of an alternative embodiment generally corresponding to FIG. 2, except that the liquid filter which surrounds the laser rod is eliminated; and FIG. 6 is a schematic view of an alternative embodiment generally corresponding to FIG. 2, except that the centrally disposed liquid filter member is eliminated.

With specific reference to the form of the invention illustrated in the drawings, the source 10 as shown in FIG. 1 is basically quite similar to the discharge source as described in the aforementioned copending application Ser. No. 261,756, filed Feb. 28, 1963, and reference should be made to this copending application for construction details. Briefly, the source 10 comprises an envelope 12 for containing the principal components comprising the radiation source, with a radiation-transmitting window portion 14 forming a small part of the enclosing envelope. In its preferred form, the major portion of the envelope is metallic for purposes of strength and is formed of stainless steel. A cooling tube 16 is provided on the exterior surface of the envelope 12 and is adapted to carry cooling water which is continuously pumped therethrough.

A radiation-reflecting means is positioned within the envelope 12 at a location which is spaced from the window 14, and this reflector is preferably formed as a reflecting surface 18 on a portion of the inner surface of the envelope 12. The radiation-reflecting surface 18 preferably has the configuration of an ellipsoid of revolution, and this ellipsoid can be formed with a relatively low eccentricity, since the laser to be pumped is positioned within the same enclosing envelope. A low eccentricity ellipsoid exhibits less aberration and magnification than does a high eccentricity ellipsoid.

The reflecting surface 18 has a first focal point 20 which is positioned within the envelope 12 at a location which is remote from the window 14, and a second focal point 22 is positioned within the envelope 12 at a location which is closer to the window 14 than the first focal point 20.

A laser means 24, which preferably is in the form of a rod, is positioned proximate the second focal point 22, in order to intercept radiations which are generated proximate the first focal point 20. As is typical of most laser materials, the rod 24 is adapted to be energized or pumped by a relatively narrow spectrum of radiations which impinge thereon and the rod 24 is so positioned within the envelope that the resulting generated coherent radiations are directed through the window 14. Preferably, the rod 24 is positioned on the extension of the axis of the reflector 18 and is maintained in this position by suitable supports 25.

Spaced electrode means comprising a cathode 26 and an anode 28 are positioned proximate the first focal point 20 and are adapted to be energized to generate therebetween an intense electric arc which is proximate the first focal point 20. The generated arc necessarily emits a wide spectrum of radiations, which includes the relatively narrow spectrum of radiations which are effective to energize the laser rod 24. In the preferred form of the present invention, a small aperture 30 is provided along the axis of the anode 28, in order to permit a small portion of the generated plasma to exit from the envelope 12 and remove a substantial portion of the products of electrode decomposition which are formed during operation of the device.

A series of gas-inlet apertures 32 are provided proximate the midpoint of the envelope 12. A discharge-sustaining gas such as argon is directed through the inlet tube 34 into a manifold 36 for distribution to the apertures 32. Preferably, the gas exits through the apertures 32 to swirl in a vortical path with respect to the axis of the ellipsoidal reflecting surface 18, and this axial movement of the gas passing over the reflector 18 provides a gas barrier between any vaporized electrode material and the reflector 18, as well as providing stability for the formed arc.

The cathode 26 and anode 28 are described in greater detail in the aforementioned copending application Ser. No. 261,756, filed Feb. 28, 1963, and because of the large power inputs thereto, these electrodes are preferably water cooled. In the embodiments as shown in FIGS. 1 and 2, a water cooling tube 38 is provided within the cathode 26 and the water cooling tube 40 is provided within the anode 28, through which water is continuously pumped in order to maintain these members as cool as possible.

In the embodiment as shown, the anode 28 is mounted into an end of the envelope 12 by means of mounting bolts 42 which exert a compressive force on a mounting plate 44, which plate in turn secures a refractory, anode mounting member 46. The cathode 26 and anode 28 are adapted to be energized by a conventional DC source.

For a very high power operation, the anode 28 is formed of tungsten, copper, or other suitable material which has a high thermal conductivity and a high boiling point. The cathode 26 can be formed of suitable materials, such as copper or tungsten.

As a specific example, the volume enclosed by the arc-enclosing portion of the envelope 12 is 4,000 cc. and argon is introduced into the envelope 12 through the apertures 32 at a rate of 3.5 cubic feet per minute and at a pressure of 210–300 p.s.i.a. The operating pressure within the envelope is 210–300 p.s.i.a. and the cross-sectional area of the aperture 30 provided through the anode is 0.013 sq. cm. Such a device is adapted to have a power input of approximately 9 kilowatts. For the foregoing conditions of operation, about 34% of the radiations are concentrated at the second focal point 22 and only about 2% of the total energy introduced into the device is lost as plasma which exits through the aperture 30. The remaining energy input is dissipated as heat.

In accordance with the present invention, a liquid filter means 48 is provided within the envelope 12 intermediate the first focal point 20 and the second focal point 22. The liquid filter 48 is operable to intercept substantially all radiations which are generated proximate the first focal point 22 by the arc discharge and directed toward the second focal point 22 proximate which the laser 24 is positioned. In its preferred form, the liquid filter 48 comprises two spaced, solid, radiation-transmitting members, such as two glass plates 50, and a selected radiation-absorbing liquid is adapted to be circulated therebetween.

An additional liquid filter 52 is desirably provided about the laser rod. In its preferred form this additional liquid filter 52 comprises a solid, radiation-transmitting envelope 54 which fits about the laser rod with a spacing therebetween. As in the case of the filter 48, liquid is adapted to be pumped into and out of the enclosing envelope 54.

In the preferred form of the invention, the envelope 12 is formed of two sections held together at the midpoint by bolts 56 which engage flange members 58 projecting from the middle portion of the envelope. This construction facilitates mounting the filter member 48.

The selection of the liquid cooling medium 60, which is pumped through the filter members 48 and 52, is dependent upon the radiation-absorbing and radiation-transmitting characteristics which are desired. For excitation of specific laser material, specific bands of radiation are desired, matched as nearly as possible to the absorption range of the specific laser material. Radiations above and below this absorption range act only to create heat in the laser material, and thus are undesirable. Liquid cooling and filter solutions which are preferred in the present radiation source are water solutions of selected salts.

As specific examples, laser rods of either calcium tungsten ($CaWO_4$) doped with neodymium or yttrium aluminum oxide or so-called (YAG) garnet ($Y_3Al_5O_{12}$) doped with neodymium are well suited for continuous laser pumping. The amount of neodymium doping is generally 0.5% by weight, although a 1% by weight doping has also been successfully employed. With such laser rods, it has been determined that high-efficiency absorption lines of neodymium in the calcium tungstate or YAG crystal lie approximately in the range of 350 nm. to 950 nm. For these specific laser materials, it is desirable to filter out substantial all radiations emanated from the pumping source except those which fall approximately within the excitation range of from 350 nm. to 950 nm., although radiations from 520 to 950 nm. will provide even better excitation.

Although many different salt solutions in water can be used to absorb radiations above and below the foregoing indicated radiation range, a 1% by weight solution of potassium chromate provides good results by allowing transmission of radiations only in the approximate range of 520 nm. to 1,150 nm. As another example, a 10% by weight of solution of sodium nitrite in water gives good results by allowing transmission only in the approximate range of 336 nm. to 1,125 nm. Although these indicated solutions are preferred, it should be understood that any other suitable radiation-absorbing and cooling liquid may be used as the fluid medium.

The device embodiment 10a as shown in FIG. 2 generally corresponds to the device embodiment 10 as shown in FIG. 1, except that the surrounding envelope 62 is formed as a double-walled envelope comprising an outer wall 62a and an inner wall 62b. The outer envelope member 62a can be made extremely strong and is adapted to have a gas pressure applied between the members 62a and 62b through the aperture 64 in order to minimize stresses which are encountered on the inner envelope 62b during operation of the source.

In both embodiments as shown and described, the cooling liquid is desirably pumped through a conventional heat exchange device 66 with only one heat exchange device being shown in block form.

As a possible alternative embodiment, the device 10 can be modified as shown schematically in FIG. 3, so that only the centrally disposed filter means 48 is utilized. Alternatively, the device 10 can be modified as shown in FIG. 4 to utilize only the additional filter means 52 which is positioned about the laser 24.

As another alternative embodiment, the device embodiment 10a as shown in FIG. 2 can be modified so that only the centrally disposed filter member 48 is utilized, as shown in FIG. 5. As yet another alternative embodiment, the device embodiment 10a as shown in FIG. 2 can be modified so that only the additional envelope-enclosed filter 52, which is disposed about the laser rod 24, is used.

While the preferred form of the invention utilizes a very high intensity source which incorporates an aperture through the anode to provide for exiting of a part of formed plasma, it should be understood that the foregoing device can be readily modified so that it operates as a more conventional, so-called, short-arc discharge device. If such modification is to be used, the power input desirably is decreased somewhat in order that excessive blackening will not occur on the inner surface of the enclosing envelope.

As a further possible alternative embodiment, while the foregoing device is preferably operated with DC excitation, it can also be operated with AC excitation, which will necessitate some reconstruction of the electrodes.

While specific laser materials and filter materials have been considered in detail in the foregoing examples, it should be understood that any laser material which is adapted to be continuously pumped can be used and its absorption spectrum matched by a suitable filter material which will transmit in substantial quantities only those radiations which are useful to energize or pump the laser.

It will be recognized that the objects of the invention have been achieved by providing a radiation source which is adapted to be continuously energized to produce continuous, coherent radiations. The source is formed as a unitary device and is very efficient in the production of such continuous, coherent radiations.

While preferred embodiments of the present invention have been illustrated and described in detail, it is to be particularly understood that the invention is not limited thereto or thereby.

We claim as our invention:

1. A radiation source for producing continuous, coherent radiations of high intensity, said radiation source comprising:
   (a) envelope means for containing the principal components comprising said source, a radiation-transmitting window forming a part of said envelope means;
   (b) radiation-reflecting means formed as an ellipsoid of revolution positioned within said envelope means at a location which is spaced from said window, said radiation-reflecting means having a first focal point positioned within said envelope means at a location remote from said window, said radiation-reflecting means also having a second focal point positioned within said envelope means at a location which is closer to said window than said first focal point of said radiation-reflecting means;
   (c) laser means positioned proximate said second focal point of said radiation-reflecting means to intercept radiations generated proximate said first focal point of said radiation-reflecting means, said laser means adapted to be energized by a relatively narrow spectrum of radiations impinging thereon and to convert such radiations into coherent radiations which are directed toward said window;
   (d) spaced electrode means positioned within said envelope means proximate said first focal point of said radiation-reflecting means and adapted to be energized to generate therebetween an intense electric arc which is proximate said first focal point of said radiation-reflecting means, with the generated arc emitting a wide spectrum of radiations which includes the relatively narrow spectrum of radiations which are effective to energize said laser means; and
   (e) selective radiation-absorbing means positioned within said envelope means intermediate said first focal point and said second focal point of said radiation-reflecting means and operable to intercept substantially all radiations generated proximate said first focal point and directed toward said second focal point of said radiation-reflecting means, said radiation-absorbing means comprising spaced, solid, radiation-transmitting members which form a liquid-tight seal with said envelope means, a selected radiation-absorbing liquid occupying the space between said radiation-transmitting members, said liquid transmitting in substantial quantity approximately only the relatively narrow spectrum of radiations which are effective to energize said laser means, and said liquid adapted to be circulated to and from the space between said radiation-transmitting solid members to facilitate cooling of said liquid exterior of said envelope means.

2. The radiation source as specified in claim 1, wherein said laser means is formed as a laser rod, and said laser rod is positioned proximate said second focal point of said radiation-reflecting means and substantially on the axial extension of said radiation-reflecting means.

3. The radiation source as specified in claim 1, wherein said spaced electrode means are liquid cooled and are adapted to be energized by a DC potential, with the anode of said electrode means having a small aperture provided therethrough and opening from said envelope means to carry a small portion of the generated plasma of the arc discharge from said envelope, and gas supply means connecting to said envelope means to supply discharge-sustaining gas to said source.

4. The radiation source as specified in claim 1, wherein said envelope means comprises a double-walled envelope having a space between the individual envelopes, and the space between the individual envelopes is adapted to have a pressure maintained therein in order to relieve pressure strains as may be encountered on the inner one of the double walls of said envelope means.

5. The radiation source as specified in claim 1, wherein there is also provided an additional liquid filter which comprises a solid radiation-transmitting inner envelope which encloses said laser means, and a liquid which absorbs a predetermined spectrum of radiations is adapted to be circulated to and from said additional radiation-transmitting envelope to facilitate cooling of said additional liquid filter.

References Cited
UNITED STATES PATENTS 3,355,674  11/1967  Hardy _____ 331—94.5

OTHER REFERENCES

Proc. of the IRE, "Output Power and Possible Continuous Operation of Ruby Lasers," J. C. COOK, pp. 330, 331, March 1962.

JOHN KOMINSKI, Primary Examiner